(12) United States Patent
Chudley et al.

(10) Patent No.: US 7,670,220 B2
(45) Date of Patent: Mar. 2, 2010

(54) RACING GAMES AND OTHER GAMES HAVING GARAGE, SHOWROOM, AND TEST DRIVE FEATURES

(75) Inventors: Martyn Chudley, Cheshire (GB); James Jen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 746 days.

(21) Appl. No.: 11/035,632

(22) Filed: Jan. 14, 2005

(65) Prior Publication Data

US 2005/0277455 A1 Dec. 15, 2005

Related U.S. Application Data

(60) Provisional application No. 60/578,775, filed on Jun. 10, 2004.

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/6; 463/7
(58) Field of Classification Search .................. 436/6; 463/6
See application file for complete search history.

(56) References Cited

U.S. PATENT DOCUMENTS 5,366,376 A * 11/1994 Copperman et al. ........... 434/69

| 6,171,186 B1 * | 1/2001 | Kurosawa et al. ............. 463/31 |
| 2002/0018982 A1 * | 2/2002 | Conroy ........................ 434/62 |
| 2004/0259059 A1 * | 12/2004 | Aoki et al. ..................... 434/61 |

OTHER PUBLICATIONS

Project Gotham Racing 2 Game Manual, Microsoft, 2003.*
Toyota : The Mega Web Theme Park in Tokyo, Dec. 16, 1998.*
Polyphony Digital, "Gran Turismo", Apr. 30, 1998, Sony Computer Entertainment, Game Manual.*
Microsoft, "Flight Simulator 98", Sep. 30, 1997, Microsoft, Game Manual.*
Jane's Information Group Ltd, "Jane's World War II Fighters", 1998, Electronic Arts.*

* cited by examiner

*Primary Examiner*—John M Hotaling
*Assistant Examiner*—Kevin Y Kim
(74) *Attorney, Agent, or Firm*—Perkins Coie LLP (57) ABSTRACT

Racing games and other computer-implemented games having garage, showroom and test drive features are disclosed herein. In one embodiment, a method for implementing a racing game in accordance with one embodiment of the invention includes displaying a plurality of cars in a simulated showroom setting. Game players can roam freely about the showroom in first-person mode and inspect the cars in close detail. If a player desires, he or she can test drive one or more of the cars to assess its performance before competing in a racing event with the car.

31 Claims, 10 Drawing Sheets

RACING GAMES AND OTHER GAMES HAVING GARAGE, SHOWROOM, AND TEST DRIVE FEATURES

CROSS-REFERENCE TO RELATED APPLICATION(S)

This application claims the benefit of U.S. Provisional Application No. 60/578,775, entitled "RACING GAMES AND OTHER GAMES HAVING GARAGE, SHOWROOM, AND TEST DRIVE FEATURES," filed on Jun. 10, 2004, which application is incorporated by reference herein in its entirety.

TECHNICAL FIELD

The following disclosure relates generally to computer-implemented games and, more particularly, to computer-implemented racing games in which players have a variety of vehicle choices.

BACKGROUND

Various computer-implemented racing games exist today. Such games include Project Gotham Racing®, published by the Microsoft Corporation of Redmond, Wash., and Grand Turismo™, published by Sony Computer Entertainment America, Inc. These games typically involve one or more players controlling simulated vehicles, such as race cars, on race tracks or surface streets in a simulated race. Each player can occupy a simulated car in first-person mode, and is presented with a display depicting the virtual environment in which all of the cars are racing. Each player's vehicle responds to his or her control inputs in a realistic manner. In addition, the simulated vehicles interact with the virtual environment and other cars in a realistic manner during the course of the race. The race can be against a clock in a single-player mode or against other players in a multi-player mode. In multi-player mode, the player who finishes the race first is generally the winner.

In addition to the basic race format described above, computer-implemented racing games can also include various other features to enhance the gaming experience. One such feature is to provide the players with a wide variety of race cars from which to choose. For example, the cars can range from relatively common sports cars to super-exotic, high-performance cars. In addition to choosing the car, the player can also choose various options such as the color of the car and/or the type of transmission, etc. Allowing the players to select and configure their own race cars adds an element of personalization to the game.

The popularity of racing games has led to the development of increasingly sophisticated simulation systems. The cars used in advanced racing games, for example, are configured to dynamically respond to control inputs in much the same way as their real-world counterparts would. For example, if a particular supercar is known for being relatively quick, then the simulated version of the car will possess the same level of performance as compared to the other simulated cars. Similarly, if a particular car has a tendency to oversteer, the simulated version will behave in the same manner when driven at speed on the simulated racecourse. Providing each of the cars with unique, real-world characteristics adds an element of realism to the game and provides the players with the added challenge of mastering a wide variety of cars having different driving characteristics.

At the start of a conventional racing game, the players are typically shown a list or graphical display of the different cars from which they can choose for the race. The player then selects his or her car from the list and begins the race. In the conventional format, the player does not have an opportunity to compare and contrast the different driving characteristics of the cars prior to the actual race.

SUMMARY

The following disclosure describes racing game architectures and other game architectures that allow players to view and/or test drive various cars in first-person mode prior to participating in a race. In one embodiment, for example, a player can elect to view a group of cars in a simulated garage setting. The player has the option of roaming freely around the garage and inspecting one or more cars at his or her whim. If the player elects to purchase one of the cars for a race, the player can do so by exchanging points or "tokens" for the car. In one aspect of this embodiment, the tokens can be earned by the player for completing prior events or races of increasing difficulty and/or by demonstrating skillful and stylish maneuvers during the events. One such scoring system is described in detail in U.S. Pat. No. 6,604,008 to Chudley, et al., which is incorporated herein in its entirety by reference.

In another embodiment, the player can elect to view a wide variety of cars from different manufacturers in a simulated showroom setting. In this embodiment, the showroom can include a plurality of individual display areas. Each display area can be dedicated to a specific car manufacturer, and can include a range of cars from the manufacturer having different levels of performance. Like the garage, the showroom provides the player with an opportunity to inspect each of the cars in close detail. In addition, the showroom offers the player an opportunity to test drive the cars on an adjacent test track. To test drive a particular car, the player does not have to possess enough tokens to actually purchase the car for use in a race. Rather, the player can test drive any of the cars available in the showroom. After a test drive, the player can elect to purchase the car (assuming he or she has enough tokens), or the player can test drive another car.

The garage and showroom features of the present invention provide players with an opportunity to acquaint themselves with various cars before selecting one for a competitive race. In this way, the players can select cars that fit their driving style and posses the performance characteristics they desire. In addition, the test drive feature allows players to experience highly sought-after cars that may presently be out of their reach because of their current token status. This feature adds breadth to the game, and motivates the players to acquire more tokens so that they can purchase the high-status cars that reflect the high level of game skill they have achieved.

DETAILED DESCRIPTION

The following disclosure describes several embodiments of systems and methods for implementing showroom features, test drive features, and other features in racing games and other computer-implemented games involving cars and other vehicles. Specific details of several embodiments of the invention are described below to provide a thorough understanding of such embodiments. Other details describing well-known structures and routines often associated with computer-implemented games are not set forth below, however, to avoid unnecessarily obscuring the description of the various embodiments. Those of ordinary skill in the art will understand that the invention may have other embodiments in addition to those disclosed below. Such embodiments may include additional elements, or they may lack one or more of the elements described below with reference to FIGS. 1-12.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Certain embodiments are described below in the context of computer-executable instructions performed by a game console or a general-purpose computer, such as a personal computer. In one embodiment, for example, these computer-executable instructions can be stored on a computer-readable medium, such as a hard disk, a floppy disk, or a CD-ROM. In other embodiments, these instructions can be stored on a server computer system and accessed via a computer network such as an intranet or the Internet. Because the basic structures and functions related to computer-executable routines and corresponding computer implementation systems are well known, they have not been shown or described in detail here to avoid unnecessarily obscuring the described embodiments.

Figure 1:
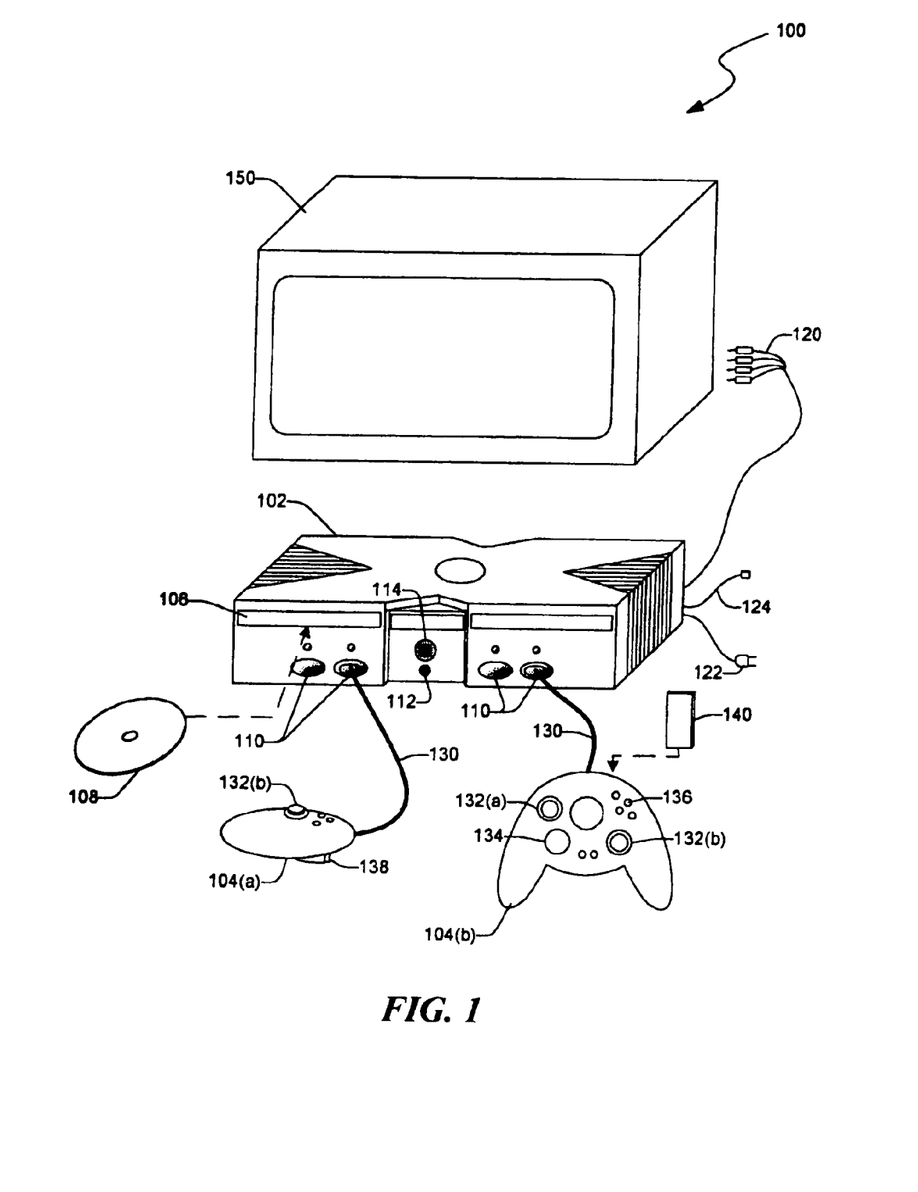
FIG. 1 is a schematic diagram illustrating a suitable gaming system on which computer-implemented racing games, video games and/or other electronic games can be implemented in accordance with several embodiments of the invention.

FIG. 1 is a schematic diagram illustrating a suitable gaming system 100 on which racing games and other computer games, video games and/or electronic games can be implemented in accordance with several embodiments of the invention. In one aspect of this embodiment, the gaming system 100 includes a plurality of controllers 104 (identified individually as a first controller 104a and a second controller 104b) operably connected to a game console 102. The controllers 104 can be connected to the game console 102 via a wired or wireless interface. For example, in the illustrated embodiment, the controllers 104 are universal serial bus (USB) compatible and are connected to the console 102 via serial cables 130 received in sockets 110. The controllers 104 can be equipped with a wide variety of user-interaction mechanisms. For example, in the illustrated embodiment, each controller 104 includes two thumbsticks 132a and 132b, a D-pad 134, various buttons 136, and corresponding triggers 138.

The foregoing features are merely illustrative of the various types of user-interaction mechanisms that can be included with the controllers 104 for implementing various aspects of the games described below. Such aspects include, for example, wandering around a garage or showroom to view a simulated car, selecting the car for a test drive, and test driving the car. In other embodiments, other controllers can include more or fewer such user-interaction mechanisms without departing from the spirit or scope of the present disclosure.

Each of the controllers 104 can be configured to accommodate two portable memory units 140 for portable storage capability. The memory units 140 enable users to store game parameters and import them for play on other game consoles. In the illustrated embodiment, each controller 104 is configured to accommodate two memory units 140. In other embodiments, however, suitable controllers can be configured to accommodate more or fewer memory units.

The game console 102 can include a plurality of cables for connection to supporting systems. For example, the game console 102 can be operably connected to a television or display 150 via audio visual interface cables 120. In addition, a power cable 122 can provide power to the game console 102. Further, a cable or modem connector 124 can facilitate information exchange between the game console 102 and a network, such as the Internet, for broadband data transmission.

The game console 102 can be equipped with an internal hard disk drive (not shown) and a portable media drive 106. The portable media drive 106 can be configured to support various forms of portable storage media as represented by an optical storage disk 108. Examples of suitable portable storage media can include DVD and CD-ROM game disks and the like. The game console 102 can further include a power button 112 and an eject button 114. Depressing the eject button 114 alternately opens and closes a tray associated with the portable media device 106 to allow insertion and extraction of the storage disk 108.

The gaming system 100 enables players and other users to enjoy various forms of entertainment including racing games and other games, music, and videos. With the different storage options available, such media can be played from the hard disk drive, the portable media drive 106, the memory units 140, or an online source. For example, the gaming system 100 is capable of playing music from a CD inserted in the portable media drive 106, from a file on the hard disk drive, or from an online streaming source. Similarly, the gaming system 100 can also play a digital audio/video game from a DVD disk inserted in the portable media drive 106, from a file on the hard disk drive (e.g., a file in Active Streaming Format), or an online streaming source.

The gaming system 100 is but one example of a suitable system for implementing embodiments of the invention. Accordingly, the methods and systems disclosed herein are not limited to implementation on the gaming system 100, but extend to numerous other general or special purpose computing systems or configurations. Examples of well-known computing systems, environments, and/or configurations that may be suitable for use with aspects of the invention include personal computers (PCs), server computers, portable and hand-held devices such as personal digital assistants (PDAs), laptop and tablet PCs, multiprocessor systems, microprocessor-based systems, set top boxes, programmable consumer electronics, network PCs, mini-computers, mainframe computers, electronic game consoles, and distributed computing environments that include one or more of the above systems or devices.

Figure 2:
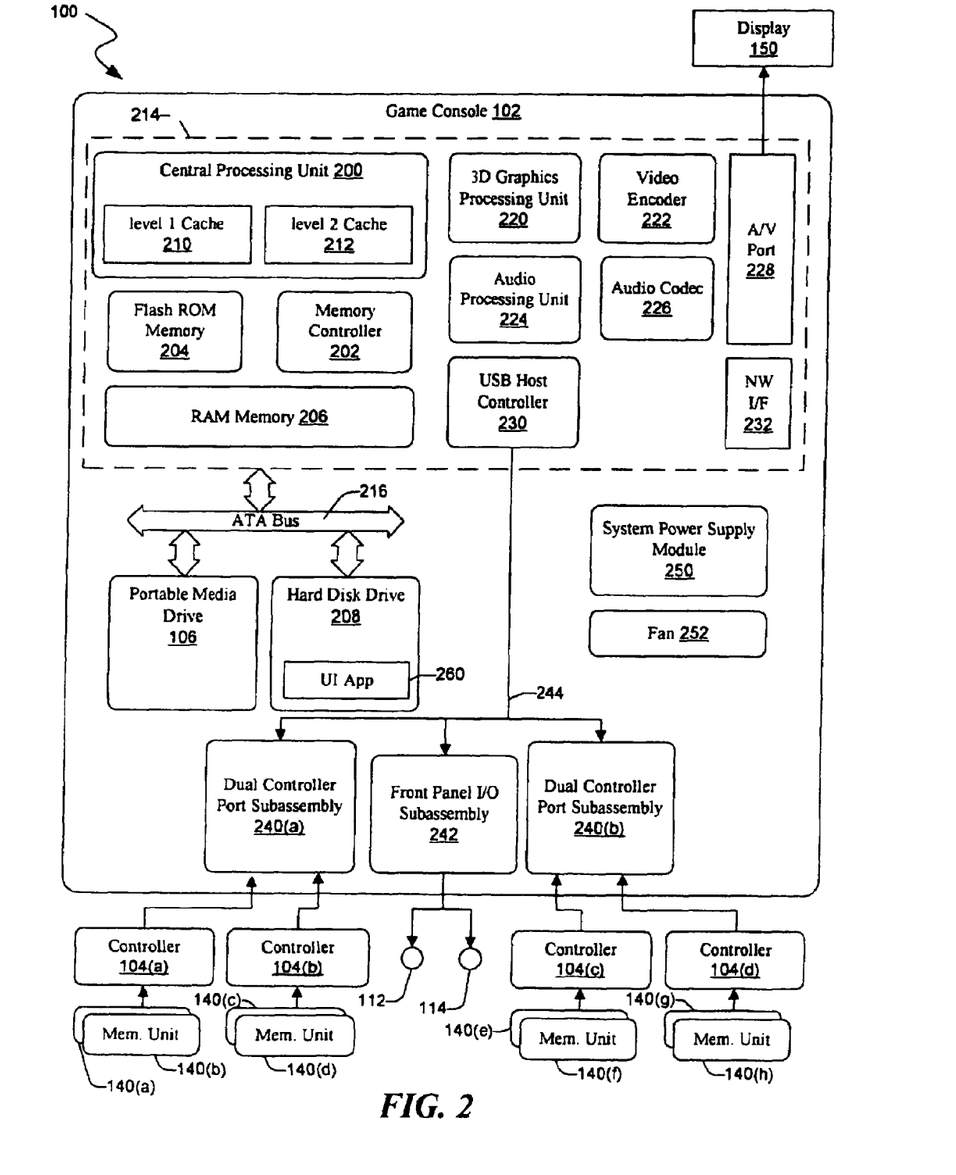
FIG. 2 is a block diagram illustrating functional components of the gaming system of FIG. 1 configured in accordance with an embodiment of the invention.

FIG. 2 is a block diagram illustrating functional components of the gaming system 100 configured in accordance with an embodiment of the invention. In one aspect of this embodiment, the game console 102 includes a central processing unit (CPU) 200 and a memory controller 202. The memory controller 202 can facilitate processor access to various types of memory. Such memory can include a flash Read Only Memory (ROM) 204, a Random Access Memory (RAM) 206, a hard disk drive 208, and the portable media drive 106. The CPU 200 can be equipped with a level one cache 210 and a level two cache 212 to temporarily store data and reduce the number of necessary memory access cycles, thereby improving processing speed and throughput. The CPU 200, the memory controller 202, and the various memory devices described above are interconnected via one or more buses, such as serial and parallel buses, memory buses, peripheral buses, and/or processor or local buses using any of a variety of bus architectures. Such architectures can include, for example, an Industry Standard Architecture (ISA), a Micro Channel Architecture (MCA), an enhanced ISA (EISA), a Video Electronics Standards Association (VESA) local bus architecture, and a Peripheral Component Interconnects (PCI) bus architecture also known as a mezzanine bus architecture.

In one embodiment, the CPU 200, memory controller 202, ROM 204, and RAM 206 can be integrated into a common module 214. In this embodiment, the ROM 204 is configured as a flash ROM that is connected to the memory controller 202 via a PCI bus and a ROM bus (neither of which is shown). The RAM 206 can be configured as a multiple Double Data Rate Synchronous Dynamic RAM (DDR SDRAM) that is independently controlled by the memory controller 202 via separate buses (not shown). The hard disk drive 208 and portable media drive 106 can be connected to the memory controller 202 via the PCI bus and an AT attachment (ATA) bus 216.

In the illustrated embodiment, a 3D graphics processing unit 220 and a video encoder 222 can form a video processing pipeline for high speed and high resolution graphics processing. Data can be carried from the graphics processing unit 220 to the video encoder 222 via a digital video bus (not shown). An audio processing unit 224 and an audio codec (coder/decoder) 226 can form a corresponding audio processing pipeline with high fidelity and stereo processing. Audio data can be carried between the audio processing unit 224 and the audio codec 226 via a communication link (not shown). The video and audio processing pipelines output data to an audio/video (A/V) port 228 for transmission to the display 150. In the illustrated embodiment, the video and audio processing components 220-228 are mounted on the module 214.

A USB host controller 230 and a network interface 232 can also be implemented on the module 214. The USB host controller 230 can be coupled to the CPU 200 and the memory controller 202 via a bus (e.g., a PCI bus), and serves as a host for peripheral controllers 104a-104d. The network interface 232 can provide access to a network (e.g., the Internet, a home network, etc.) and may be any of a wide variety of wire or wireless interface components including an Ethernet card, a modem, a Bluetooth module, a cable modem, and the like.

The game console 102 can include dual controller port subassemblies 240a and 240b, and each subassembly can support two corresponding peripheral controllers 104a-104d. A front panel I/O subassembly 242 supports the functionality of the power button 112 and the eject button 114, as well as any light emitting diodes (LEDs) or other indicators exposed on the outer surface of the game console 102. The subassemblies 240a, 240b, and 242 are coupled to the module 214 via one or more cable assemblies 244.

Eight memory units 140a-140h are illustrated as being connectable to the four controllers 140a-140d in a two memory units per controller configuration. Each memory unit 140 offers additional storage on which games, game parameters, and other data may be stored. When inserted into a controller, the memory unit 140 can be accessed by the memory controller 202. A system power supply module 250 can provide power to the components of the gaming system 100, and a fan 252 can cool the circuitry within the game console 102.

The game console 102 described above can implement a uniform media portal model that provides a consistent user interface and navigation hierarchy to move users through various entertainment areas. The portal model offers a convenient way to access multiple different types of media content including game data, audio data, and video data regardless of the media type inserted into the portable media drive 106. To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console. Aspects of the UI application and some of the exemplary screen displays it presents are described below in more detail.

The gaming system 100 may be operated as a standalone system by simply connecting the system to the display 150. In the standalone mode, the gaming system 100 allows one or more players operating the controllers 104 to play games and view them on the display 150. With the broadband connectivity made possible via the network interface 232, however, the gaming system 100 can also be operated in a larger, network-based gaming community.

Figure 3:
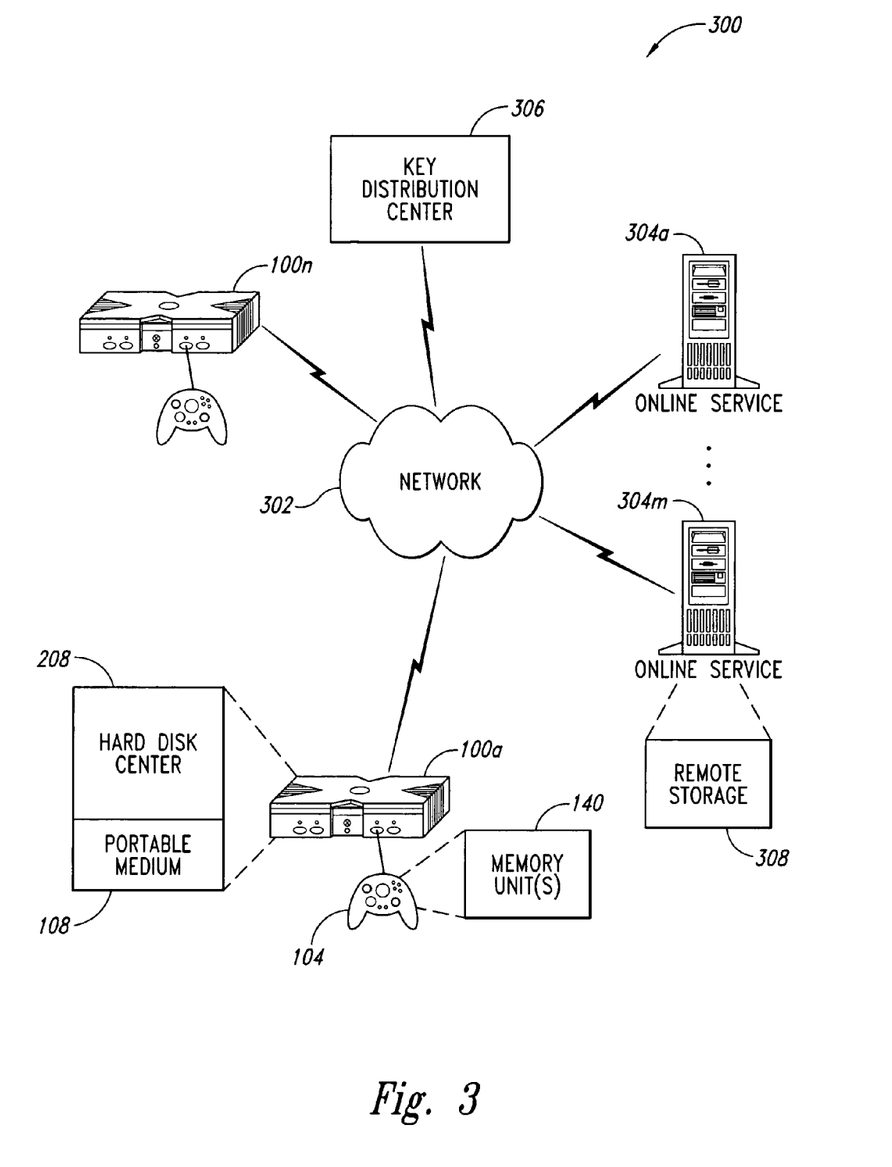
FIG. 3 is a schematic diagram of a gaming environment suitable for implementing various embodiments of the invention.

FIG. 3 is a schematic diagram of a gaming environment 300 suitable for implementing various embodiments of the invention. In the illustrated embodiment, the gaming environment 300 includes a plurality of the gaming systems 100a, . . . 100n interconnected via a network 302. The network 302 represents any of a wide variety of data communications networks and may include public portions (e.g., the Internet), as well as private portions (e.g., a residential Local Area Network (LAN)). Further, the network 302 may be implemented using any one or more of a wide variety of conventional communications configurations including both wired and wireless types. Any of a wide variety of communications protocols can be used to communicate data via network 302, including both public and proprietary protocols. Examples of such protocols include TCP/IP, IPX/ISPX, NetBEUI, etc.

The gaming environment 300 can further include one or more online services 304a, . . . 304m connected to the gaming systems 100 via the network 302. The online services 304 can provide various services to the players, such as hosting online games, serving downloadable music or video files, hosting gaming competitions, serving streaming A/V files, and the like. The gaming environment 300 can additionally include one or more remote storage locations as exemplified by remote storage 308 at online service 304*m*. The remote storage 308 provides another location for storing data files in addition to the optical storage disk 108, the hard disk drive 208, and the MU(s) 140. The gaming environment 300 may further employ a key distribution center 306 that plays a role in authenticating individual players and/or gaming systems 100 to one another as well as to online services 304. The distribution center 306 distributes keys and service tickets to valid participants that may then be used to form games including multiple players or to purchase services from online services 304.

Figure 4:
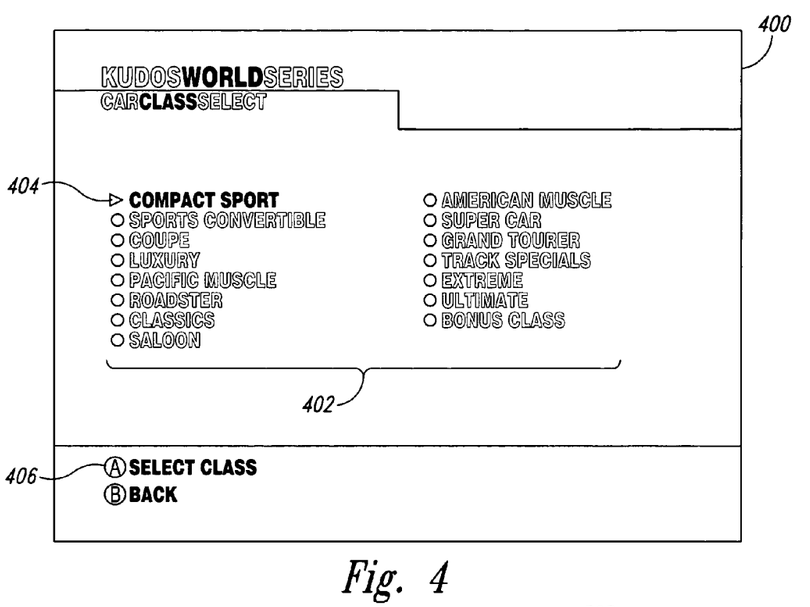
FIG. 4 illustrates a screen display for selecting a class of car to race in accordance with an embodiment of the invention.

FIG. 4 illustrates a screen display 400 for selecting a class of car to race in accordance with an embodiment of the invention. In one aspect of this embodiment, the screen display 400 includes a plurality of different car classes 402 from which a player can choose for a particular race. Each of the car classes 402 can include a group of cars having similar performance parameters. In the illustrated embodiment, for example, the car classes 402 include "compact sport," "sports convertible," "luxury," "classic," and "supercar," among others. As described in greater detail below, these classes include facsimiles of real-world cars from well known manufacturers. In addition, the car classes 402 can also include one or more classes of fictional cars such as "extreme cars," "ultimate cars," and a "bonus class." To select one of the car classes 402, the player moves a pointer 404 adjacent to the desired class (e.g., compact sport) by manipulating a corresponding user-interaction mechanism on the controller 104 (FIGS. 1-3). Once the pointer 404 has been positioned, the player selects an "A" button 406 to confirm his or her selection of the class.

Figure 5:
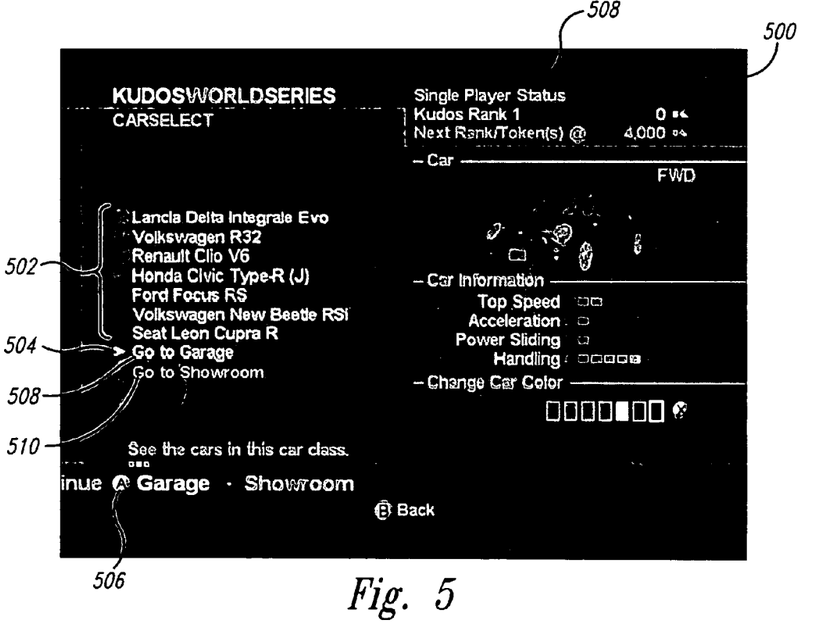
FIG. 5 illustrates a screen display for selecting a particular car to race in accordance with an embodiment of the invention.

FIG. 5 illustrates a screen display 500 corresponding to a car class selection from the screen display 400 described above. In the illustrated embodiment, the screen display 500 corresponds to the compact sport class, and provides the player with three different options for selecting a car to race from this class. The first option lets the player select a car directly from the screen display 500 by choosing a car from a list 502. To select a car in this manner, the player simply positions a pointer 504 adjacent to the name of the desired car in the list 502 and selects a corresponding "A" button 506.

As the screen display 500 illustrates, a portion of the compact sport car names in the list 502 are presented in shaded text. The shaded text indicates that the player lacks a sufficient amount of points or tokens (e.g., "kudos tokens") to unlock (i.e., purchase) these cars. As described in greater detail below, in one embodiment, such points or tokens are awarded to the player for completing different events or stages in the game and/or for demonstrating stylish and skillful maneuvers during an event. As the player progresses through the different levels of play, the player is awarded more points (e.g., more "kudos points"). The points determine a player's rank (e.g., "kudos rank"). As the player achieves progressively higher levels of rank, the player is awarded additional kudos tokens that can be exchanged for a car, enabling the player to "unlock" the car. Once a car has been unlocked, the player's ownership of the car is recorded on the hard disk of the console 102 (FIGS. 1-3) in the player's profile, and the player is free to use the car in subsequent racing events.

The kudos token system described above represents one method for unlocking and/or purchasing a car in accordance with the present disclosure. In other embodiments, other methods and systems can be used by a player to gain access to and/or purchase a car. Such methods can include, for example, exchanging other forms of "value" or "points" for a car. Such forms of value can be obtained by demonstrating skill or, alternatively, they can be arbitrarily awarded to a player at the start of a game. In a further embodiment, the cars can be available without exchanging any form of value or points for the cars, but simply by indicating a desire to unlock and/or purchase a particular car.

In contrast to the cars described above with shaded names, the cars in the list 502 with unshaded names (e.g., the Volkswagen New Beetle RSi and the Seat Leon Cupra R) can be used by the player without exchanging any tokens. As can be seen by reference to a player status field 508, in the illustrated embodiment, this particular player has zero kudos tokens. As a result, this player can only choose between the New Beetle RSi or the Cupra R for racing at this time.

The second option for selecting a car includes visiting a garage to view the cars in the selected class up close and in more detail before making a choice. To go to the garage, the player positions the pointer 504 adjacent to a garage identifier 508 and selects the "A" button 506.

Figure 6A:
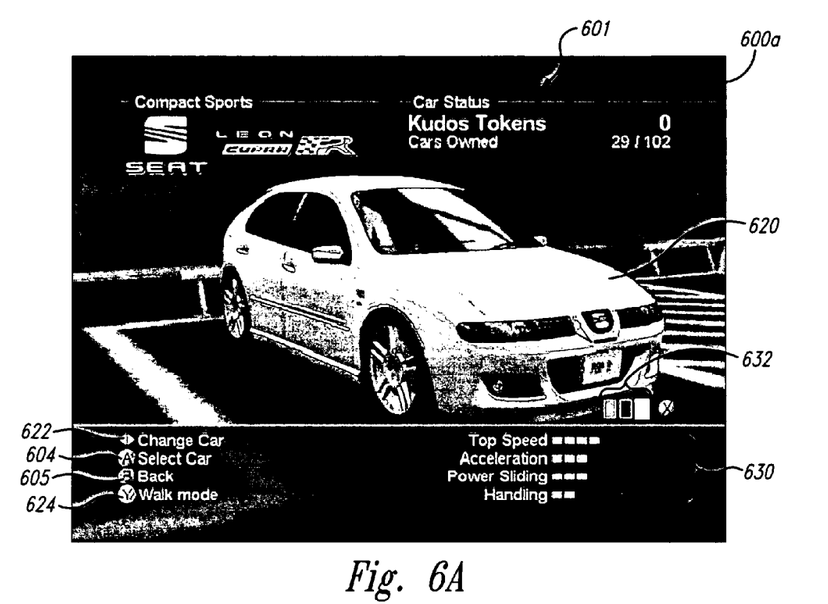
FIG. 6A-6D illustrate various screen displays showing different views from within a garage configured in accordance with an embodiment of the invention.

FIG. 6A-6D illustrate screen displays 600*a-d*, respectively, showing various views from within a simulated garage 601 configured in accordance with an embodiment of the invention. In one aspect of this embodiment, the garage 601 holds all the cars in the selected class (e.g., the compact sport class). Similarly, other garages exist for each of the other classes of car (e.g., sports convertible, coupe, etc.). Referring first to FIG. 6A, the screen display 600*a* includes a high-resolution simulation of a compact sport car 620 (e.g., the Cupra R) from the list 502 of FIG. 5. Selecting the "Y" button 624 allows the player to roam freely about the garage 601 in first-person mode by manipulating one or more of the user-interaction mechanisms on the player's controller 104 (FIGS. 1-3). This feature allows the player to view the car 620 from various angles and inspect the car in close detail. The player can change the color of the car by selecting the desired color from a color palette 632. In addition to roaming around the garage 601 in a first-person walking mode, the player can also jump from one car to the next in the garage 601 by selecting a jump button 622.

To help the player make his or her decision about whether to choose the car 620, the screen display 600*a* further includes a plurality of car performance fields 630 illustrating various performance characteristics of the car 620. These characteristics can include, for example, top speed, acceleration, power sliding ability, and handling. If the player wishes to choose the car 620, he or she can do so by selecting the "A" button 604. Alternatively, the player can jump back to the prior screen display by selecting a "B" button 605.

Figure 6B:
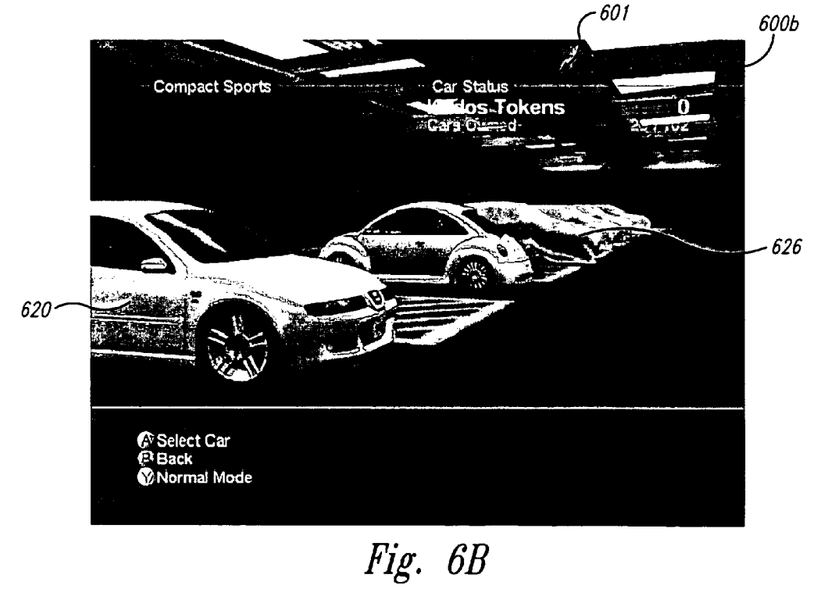

FIG. 6B illustrates a screen display 600*b* depicting a broader view within the garage 601. This view includes a plurality of compact sport cars in addition to the Cupra R 620. In the illustrated embodiment, a portion of the cars are covered with tarps 626 while the Cupra R 620 and a Volkswagen New Beetle Rsi 621 are uncovered. The tarps 626 indicate that the player lacks the amount of tokens required to unlock and purchase the covered cars. Accordingly, only the Cupra R 620 and the Volkswagen New Beetle RSi 621 are available to this particular player. If the player is considering the Volkswagen, the player can walk over to the Volkswagen in first-person mode and inspect the car in closer detail. Alternatively, as described in greater detail below, if the player would like to test drive any of the cars in the garage 601, the player can use the "B" button 605 to jump back to the screen display 500 of FIG. 5 and select the showroom feature.

Figure 6C:
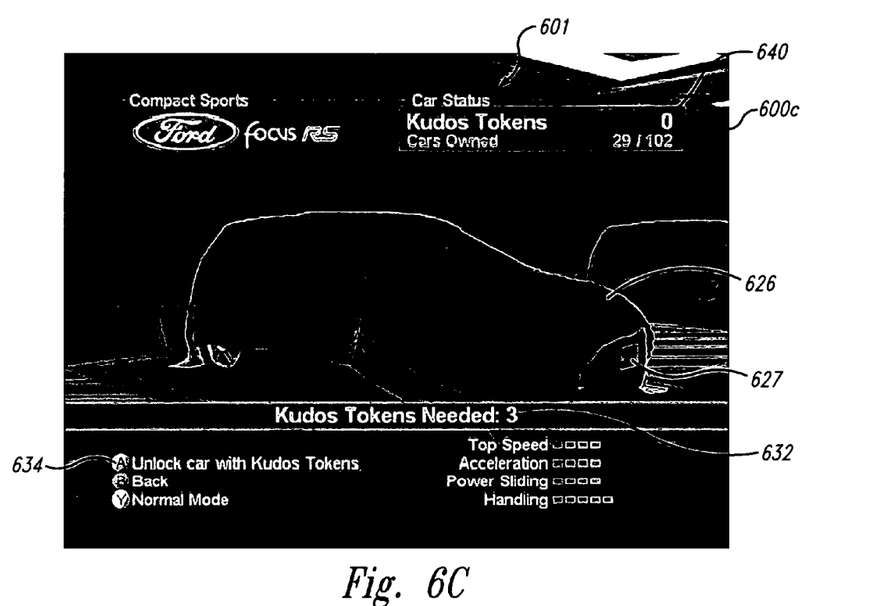

FIG. 6C illustrates a screen display 600*c* of another view in the garage 601 showing a compact sport car 627 (e.g., a Ford Focus RS) covered by a tarp 626. A cost-to-unlock field 632 indicates that three kudos tokens are needed to unlock the car 627. However, a car status field 640 indicates that the player does not have enough kudos tokens to unlock the car 627. If the player did have enough kudos tokens to unlock the car 627, the player could do so by selecting an "A" button 634.

Figure 6D:
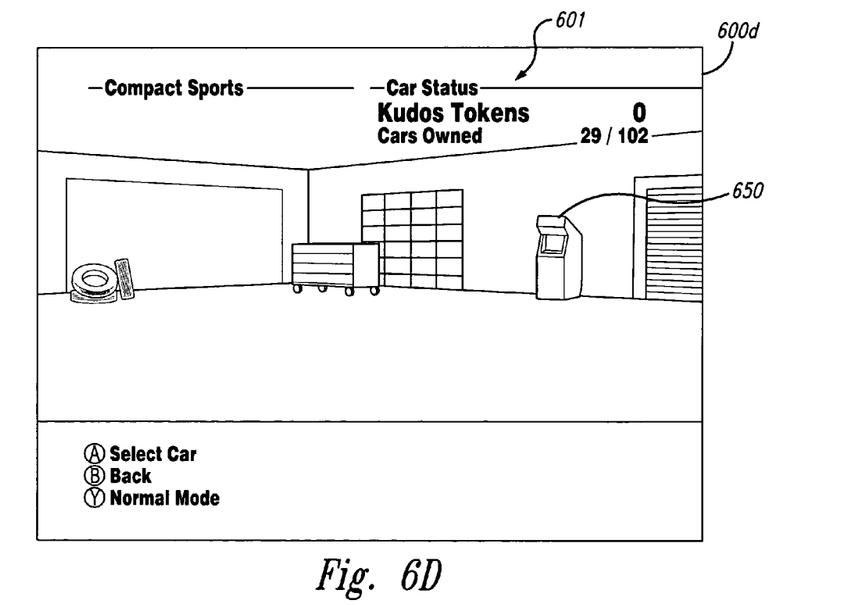

FIG. 6D illustrates a screen display 600d of yet another view in the garage 601 showing various items including a simulated tool box, spare wheel rims, and other assorted car-related equipment. In addition to these items, the garage 601 further includes a simulated arcade cabinet 650. In one aspect of this embodiment, the player can approach the arcade cabinet 650 in first-person mode and begin playing a computer-implemented game (e.g., "Geometry Wars") with the arcade cabinet 650. Thus, this feature enables the player to play a game within a game. This feature adds a twist to the garage 601 because the player may be surprised to find that the arcade cabinet 650 is actually functional. Further, this feature enhances the gaming experience by increasing the realism of the garage 601 and by piquing the player's interest as to what other surprises may be in store.

As mentioned above with reference to FIG. 5, there are at least three different ways a player can select a car for a race. First, the player can select the car directly from the screen display 500. Second, the player can visit the garage 601 (FIGS. 6A-6D) and view one or more of the cars before choosing. The third option is for the player to visit a simulated showroom to view and/or test drive one or more of the cars before choosing. Referring back to FIG. 5, to go from the screen display 500 to the showroom, the player positions the pointer 504 adjacent to a showroom identifier 510 and selects the "A" button 506. (The player can also go directly from the garage 601 to the showroom.)

Figure 7:
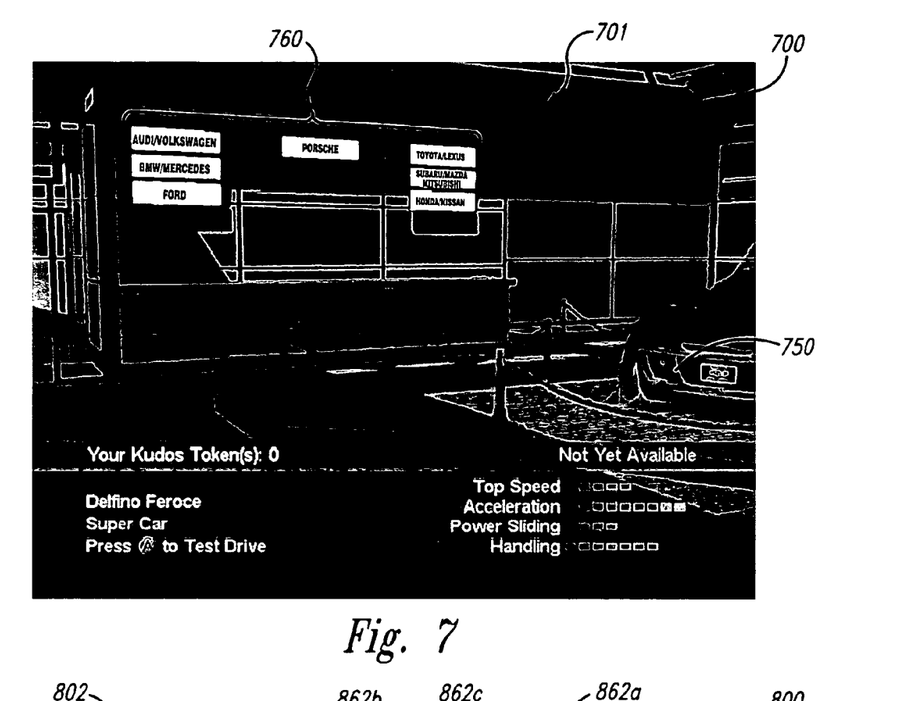
FIG. 7 illustrates a screen display of an entryway of a showroom configured in accordance with an embodiment of the invention.

FIG. 7 illustrates a screen display 700 of an entryway 703 of a showroom 701 configured in accordance with an embodiment of the invention. The showroom 701 of the illustrated embodiment has the look and feel of a new car showroom. In other embodiments, however, other types of showrooms having other appearances can be used without departing from the present disclosure. In one aspect of the illustrated embodiment, the entryway 703 includes a trophy car 750 covered with a tarp. Although only one trophy car is shown in FIG. 7, the entryway 703 can include a plurality (e.g., five) of such cars. The trophy cars can be highly desirable and awarded to the player for achieving successively higher skill levels of the racing game. In this manner, the trophy cars motivate the player to continue playing the game and increasing his or her skill level.

In addition to the trophy car 750, the entryway 703 can also include a plurality of manufacturer signs. In the illustrated embodiment, for example, the entryway 703 includes a first plurality of manufacturer signs 760 to the left (as shown), and a second plurality of manufacturer signs to the right (not shown). These signs indicate the various types of cars that are available in different wings of the showroom 701 for viewing and/or test driving by the player. For example, the signs illustrated in FIG. 7 indicate that cars from Audi/Volkswagen, BMW/Mercedes, Honda/Nissan, etc. are available for viewing and/or test driving in the left wing of the showroom 701. Similarly, cars from other manufacturers are available in a corresponding right wing (not shown) of the showroom 701.

Figure 8:
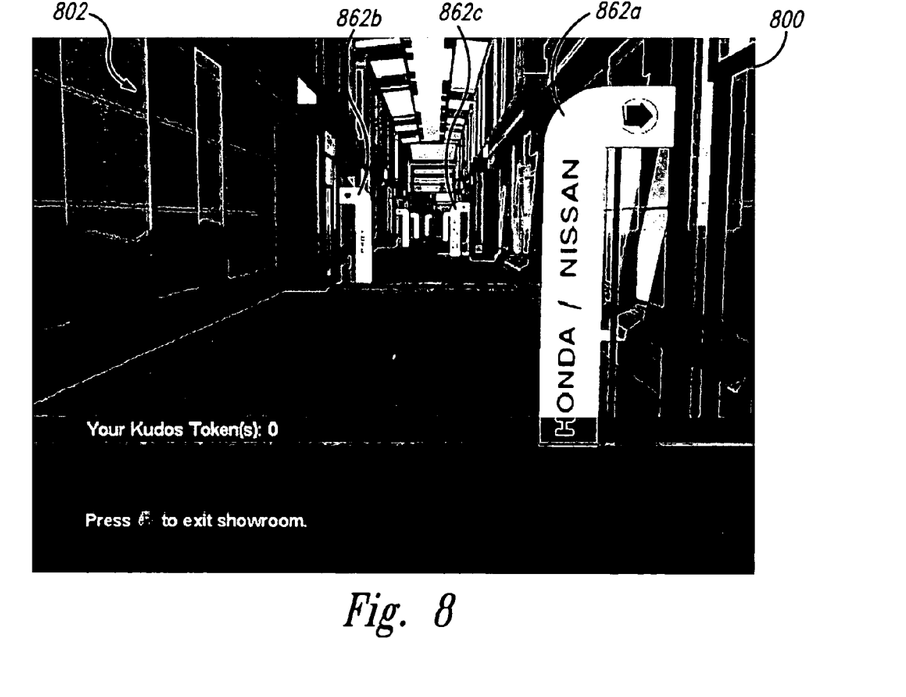
FIG. 8 illustrates a screen display of a hallway of the showroom of FIG. 7.

FIG. 8 illustrates a screen display 800 of a view looking down a hallway 802 in the left wing of the showroom 701 (FIG. 7). The hallway 802 includes a plurality of manufacturer signs 862 (identified individually as manufacturer signs 862a-c) corresponding to the manufacturer signs 760 illustrated in FIG. 7. Each of the signs 862 is positioned directly adjacent to an entrance into a corresponding manufacturer display area. The player can roam down the hallway 802 in first-person mode and turn into any manufacturer display area he or she desires to view and/or test drive the cars parked within.

Figure 9:
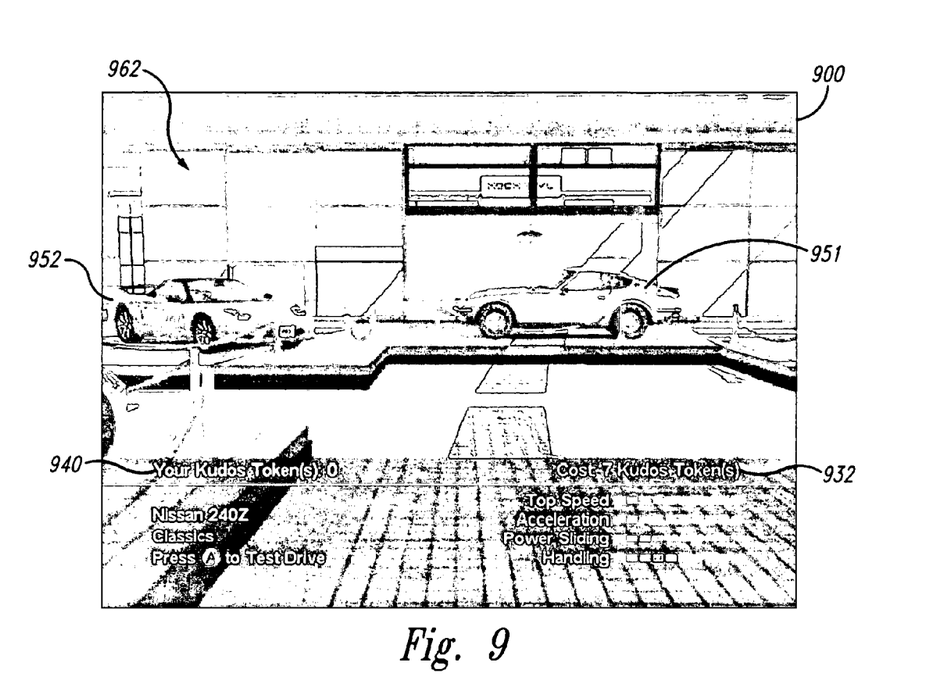
FIG. 9 illustrates a screen display depicting a manufacturer-specific display area of the showroom of FIG. 7.

FIG. 9 illustrates a screen display 900 depicting the interior of a manufacturer display area 962 configured in accordance with an embodiment of the invention. In contrast to the garage 601 (FIGS. 6A-6D) that contains only a single class of cars but from many manufacturers, the manufacturer display area 962 includes many classes of cars but from only a single manufacturer (e.g., Honda/Nissan). For example, in the illustrated embodiment, the Honda/Nissan showroom includes a "classic" car 951 (e.g., a Nissan 240Z) and a "track special" 952 (e.g., a Honda NSX Type-R)—two different classes of car but the same manufacturer. If the player wishes to unlock and purchase, for example, the Nissan 240Z 951, the player must have at least 7 kudos tokens, as indicated by a cost-to-unlock field 932. As a kudos status field 940 indicates, however, this player lacks the 7 kudos tokens required to unlock and purchase the Nissan 240Z 951.

Although the player currently lacks the kudos tokens required to unlock a car and use it in a race, the player can still test drive any of the cars in the manufacturer display area 962, as well as any of the cars in any of the other manufacturer display areas. This feature enables the player to experience a wide range of cars having different driving characteristics and attributes, and motivates the player to acquire enough kudos tokens to ultimately be able to unlock and purchase any car of his or her choosing. In a further aspect of this embodiment, the amount of kudos required to unlock a particular car can vary based on the subjective desirability of the particular car. As an example, the Nissan 240Z 951 of the illustrated embodiment requires only 7 kudos tokens to unlock, while the NSX Type-R 952 requires 13.

Figure 10:
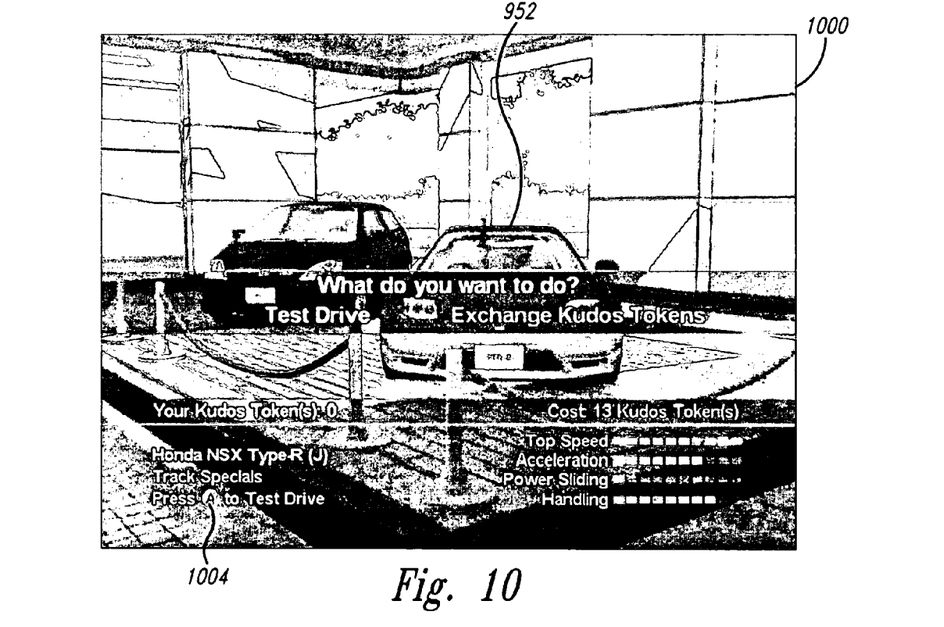
FIG. 10 illustrates a screen display of a car in the showroom of FIG. 7.

FIG. 10 illustrates a screen display 1000 in which the player has walked over to the second car 952 (e.g., the NSX Type-R) for closer inspection. The screen display 1000 gives the player the option of purchasing the car by exchanging kudos tokens or taking the car for a test drive. If the player decides to test drive the NSX Type-R 952, the player presses an "A" button 1004. In one aspect of this embodiment, after the player selects the test drive option, various screen displays can be presented showing the NSX Type-R 952 rolling out of the showroom 701 and onto an adjacent test track.

Figure 11:
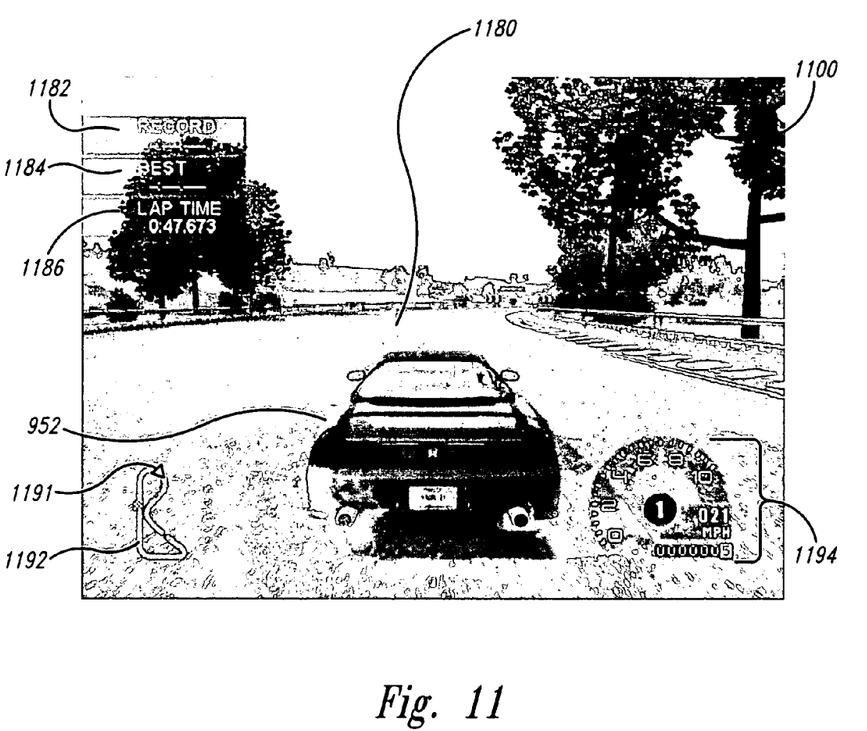
FIG. 11 illustrates a screen display depicting the car of FIG. 10 positioned on a test track.

FIG. 11 illustrates a screen display 1100 depicting the NSX Type-R 952 positioned on a simulated test track 1180 adjacent to the showroom 701 (FIGS. 7-10). The player can "drive" the NSX Type-R 952 around the test track 1180 with the user-interaction mechanisms on the controller 104 (FIGS. 1-3) to test the performance of the NSX Type-R 952. The player has the option of viewing the NSX Type-R 952 and the track environment from outside the car as illustrated in FIG. 11, or from inside the car in first-person mode. As the player is driving, the relative position of the NSX Type-R 952 on the track 1180 is represented by a car position marker 1191 on a miniature track 1192. In addition, a tachometer, digital speedometer, and odometer in an instrument cluster 1194 provide the player with operating information during the test drive.

The screen display 1100 includes a number of data collection features that enable the player to record his or her performance in the NSX Type-R 952 for comparison to other cars. For example, the screen display 1100 can include a "RECORD" field 1182, a "BEST" field 1184, and a "LAP TIME" field 1186. The RECORD field 1182 can display the player's best-ever lap time on the test track 1180, regardless of the particular type of car the player was testing at the time. The BEST field 1184 can display the player's best lap time in the particular car (for example, the NSX Type-R 952) he or she is currently testing. The LAP TIME field 1186 can display the player's elapsed time on the current lap.

In one aspect of this embodiment, as the player test drives the NSX Type-R 952 around the test track 1180, the simulated car responds to the player's control inputs in much the same way that a "real" NSX Type-R would react to analogous control inputs. That is, the simulated version of the car tends to replicate many of the dynamic characteristics and attributes of the real version. For example, if a real NSX Type-R can out-accelerate most other cars, then the simulated version will have the same capability relative to the other simulated cars. In addition, if a real NSX Type-R has a tendency to oversteer or understeer, then the simulated version will exhibit similar cornering characteristics. By giving each of the cars a unique set of dynamic attributes that reflect their real-world counterparts, the player is allowed to experience and compare the different driving characteristics of a wide range of cars in various classes. This feature adds an extra dimension to the game that does not exist in driving games in which all of the cars demonstrate the same driving characteristics.

In addition to the foregoing, the test drive feature of the present invention can also incorporate other features to enhance the test drive experience. For example, in one embodiment, the test drive can include one or more "ghost" cars running on the track 1180 at the same time as the test car. These ghost cars can be stored performances from the player using other cars, or they can be stored performances of other players that have been downloaded from a remote server computer. By running the ghost cars concurrently, the player is able to directly compare the performance of different car types and different drivers to better assess his or her abilities in the particular car being tested.

Although, in the illustrated embodiment, the player can take the NSX Type-R 952 for a "test drive" around the track 1180, in other embodiments, the player can perform other tests with the NSX Type-R 952 and/or other cars to determine their comparative performance capabilities. For example, in another embodiment, the player can test car performance around a "cone challenge" course. In a further embodiment, the player can test and compare the 0-60 mph time of a car, the 0-100-0 time, and/or the standing quarter mile time. Accordingly, a player can perform a multitude of different tests with different cars to determine their relative performance characteristics in accordance with present invention.

After test driving the NSX Type-R 952, the player may elect to unlock the car and purchase it for use in a racing event. Alternatively, the test drive may have shown the player that the car lacks a certain attribute that the player desires for racing. Accordingly, the player may elect to test drive another car before making his or her selection for a subsequent race. If so, the player can return to the showroom 701 (FIGS. 7-10) and select another car from any of the manufacturer display areas for another test drive on the track 1180.

The various screen displays described above with reference to FIGS. 4-11 are representative of but one embodiment of the present invention. Accordingly, in other embodiments, other screen displays can be used to provide the garage, showroom, test drive, and other features described above without departing from the spirit or scope of the present invention. For example, in one other embodiment, a garage configured in accordance with the present invention can hold cars from more than a single class. Similarly, in a further embodiment, a showroom configured in accordance with the present invention can have cars from more than one manufacturer gathered in a single display area.

In yet another embodiment, aspects of the present invention can extend to viewing and/or testing equipment and devices other than vehicles. For example, in one other embodiment, a room (or set of rooms) in a showroom or similar setting can contain a group of guns that a player can select from to test (e.g., on a simulated firing range) before selecting one for use in a computer-implemented game. In a further embodiment, a room or other area can contain a group of musical instruments that the player can "play" to compare. Accordingly, the present invention is not limited to the particular embodiments reflected in the screen displays described above, but extends to other embodiments in which one or more players compare "performance" of two or more different devices.

Figure 12:
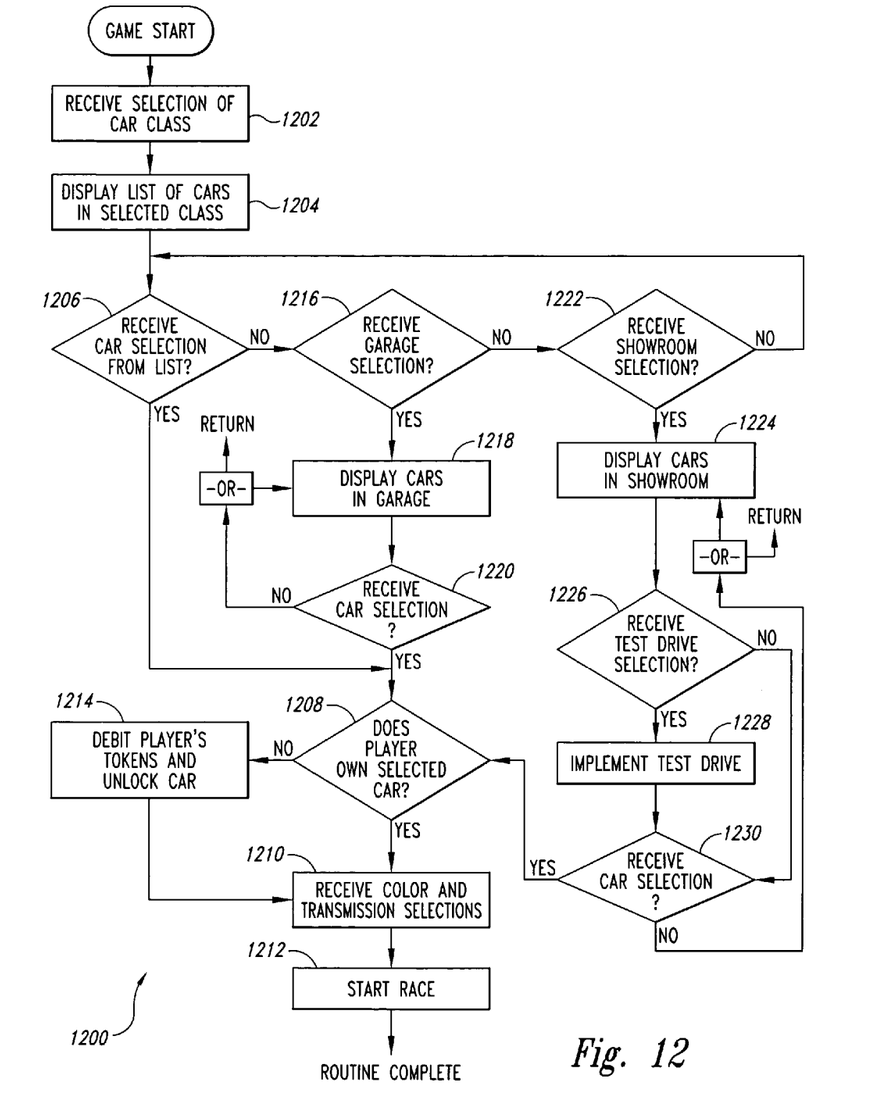
FIG. 12 is a flow diagram illustrating a routine for selecting a car in a racing game in accordance with an embodiment of the invention.

FIG. 12 is a flow diagram illustrating a routine 1200 for selecting a car at the start of an auto racing game in accordance with an embodiment of the invention. In block 1202, the routine receives a selection of a car class by a player. In one embodiment, the car class can correspond to one of the different classes of cars listed in FIG. 4 and described above (e.g., compact sport, sports convertible, coupe, etc.). After receiving the car class selection, the routine displays a list of cars in the selected class in block 1204. The routine then proceeds to decision block 1206 to determine if the player has selected one of the cars from the displayed list. If so, then the routine proceeds to decision block 1208 to determine if the player already owns the selected car.

If the player already owns the selected car, then the routine proceeds directly to block 1210 and receives the color and transmission selections from the player. Conversely, if the player does not own the car, then in block 1214 the routine removes a preset number of kudos tokens from the player's total in exchange for the car and unlocks the car for the player. Then the routine receives car color and transmission selections from the player in block 1210. In block 1212, the routine starts a race in which the player controls a simulated version of the selected car having the color and type of transmission chosen by the player in block 1210. After block 1212, the routine is complete.

Returning to decision block 1206, if the routine does not receive a car selection from the list displayed in block 1204, then the routine proceeds to decision block 1216 to determine if it has received a request from the player to visit the garage. If the routine has received a garage request, then in block 1218 the routine displays the interior of the requested garage showing one or more of the cars in the selected class. In decision block 1220, the routine determines if it has received a selection from the player of one of the cars in the garage. If not, then the routine can continue to display cars in the garage or, alternatively, the routine can return to block 1204 and repeat the display of the list of cars in the selected class. Conversely, if the routine does receive a car selection in decision block 1220, then the routine advances to decision block 1208 and proceeds as described above.

Returning to decision block 1216, if the routine does not receive a garage request from the player, then the routine proceeds to decision block 1222 to determine if it has received a showroom request from the player. If the routine has not received a showroom request, then the routine can continue to wait for a car selection, a garage request, a showroom request, or some other input from the player. Conversely, if the routine does receive a showroom request from the player, then the routine proceeds to block 1224 and displays at least some cars in a simulated showroom setting. In decision block 1226, the routine determines if it has received a test drive selection from the player corresponding to a car in the showroom the player wishes to test drive. If so, then in block 1228, the routine implements a test drive for the player using the selected car. Returning to decision block 1226, if the routine does not receive a test drive selection, then the routine proceeds directly to decision block 1230.

In decision block 1230, the routine determines if it has received a car selection from the player corresponding to a car in the showroom the player wishes to purchase for use in a race. Such a selection may be the result of the player test driving the car in block 1228 and finding the car to his or her liking. If the routine does receive a car selection from the player, the routine advances to decision block 1208 and proceeds as described above. Conversely, if the routine does not receive a car selection from the player, then the routine can continue to display cars in the showroom. Alternatively, if the player wishes, the routine can return to block 1218 and display the garage or return to block 1204 and display the list of cars in the selected class.

From the foregoing, it will be appreciated that specific embodiments of the invention have been described herein for purposes of illustration, but that various modifications may be made without deviating from the spirit and scope of the invention. For example, although selected embodiments of the invention have been described above in the context of car racing games, in other embodiments, the methods and systems disclosed herein can be used in other types of games involving other types of vehicles. Such games can include, for example, games in which the player or players choose from one or more different types of vehicles or other equipment before the start of actual competitive play. For example, in an air racing or air combat game, methods at least generally similar to those described above can be implemented to allow the players to test and compare one type of aircraft to another. Similarly, such methods can also be used in boat racing games, motorcycle racing games, and essentially any type of game where a choice of different type of vehicle and/or equipment is available to the players. Accordingly, the invention is not limited, except as by the appended claims.

We claim:

1. A computer-implemented method for selecting a car in a racing game, the racing game including a race portion, the method comprising:
 viewing a plurality of different cars in a showroom setting, wherein the plurality of different cars may be viewed simultaneously;
 selecting a first car of the plurality of different cars for a test drive, wherein the first car has not been purchased, and wherein the first car may not be used to race until it has been purchased;
 test driving the first car; and
 competing in the race portion of the racing game with at least one of the first car or a second car of the plurality of different cars.

2. The method of claim 1 wherein test driving the first car includes test driving the first car on a first track, and wherein competing in the race portion of the racing game includes driving at least one of the first car and a second car on a second track different than the first track.

3. The method of claim 1 wherein the racing game awards points to players based on game performance, and wherein the method further comprises exchanging points for the first car before using the first car to compete in the race portion of the game.

4. A computer-based method for implementing a racing game, the method comprising:
 identifying a plurality of cars that are available to a player for use in the racing game, wherein a car may not be used to race until it has been purchased;
 displaying more than one car in a simulated garage setting, wherein the more than one car may be displayed simultaneously;
 receiving a selection from the player of one of the plurality of cars; and
 in response to receiving the selection, enabling the player to test drive the selected car, wherein the player may test drive the selected car even if the selected car is unavailable for the player to use in another portion of the racing game.

5. The method of claim 4 wherein the racing game includes a race, and wherein enabling the player to test drive the selected car includes enabling the player to test drive the selected car before the start of the race.

6. The method of claim 4 wherein the racing game includes a race, wherein receiving a selection from the player includes receiving a first selection from the player of a first car, and wherein the method further comprises:
 receiving a second selection from the player of a second car different from the first car; and
 in response to receiving the second selection, enabling the player to drive the second car in the race.

7. The method of claim 4 wherein identifying a plurality of cars that are available for use by the player in the game includes displaying one or more of the cars in a simulated garage setting in which the cars are grouped by class.

8. The method of claim 4 wherein identifying a plurality of cars that are available for use by the player in the game includes displaying one or more of the cars in a simulated showroom setting.

9. The method of claim 4 wherein identifying a plurality of cars that are available for use by the player in the game includes displaying one or more of the cars in a simulated showroom setting in which the cars are grouped by manufacturer.

10. The method of claim 4 wherein identifying a plurality of cars that are available for use by the player in the game includes displaying one or more of the cars in a simulated showroom setting, and wherein enabling the player to test drive the selected car includes enabling the player to test drive the selected car on a simulated test track adjacent to the showroom.

11. The method of claim 4, further comprising:
 identifying a plurality of car classes available to the player for use in the racing game; and
 receiving a selection from the player of one of the car classes, wherein identifying a plurality of cars that are available to the player for use in the racing game includes identifying a plurality of cars in the selected class.

12. The method of claim 4 wherein the player has earned points in the game, and wherein the method further comprises exchanging a portion of the player's points for the selected car before the player can use the car in a race.

13. A computer-implemented method for receiving a vehicle selection from a player, the vehicle selection identifying a simulated vehicle the player will use in a game, the method comprising:
 identifying a plurality of vehicles that are available to the player for use in the game;
 displaying more than one vehicle in a simulated showroom setting, wherein the more than one vehicle may be displayed simultaneously;
 receiving a first selection from the player corresponding to a first vehicle that the player wishes to test before the game, wherein the player may not race with the first vehicle if the player has not purchased the first vehicle;

in response to receiving the first selection, enabling the player to test the first vehicle;
receiving a second selection from the player corresponding to a second vehicle that the player wishes to use in the game; and
in response to receiving the second selection, enabling the player to use the second vehicle in the game.

14. The method of claim 13 wherein identifying a plurality of vehicles that are available to the player for use in the game includes identifying a plurality of cars.

15. The method of claim 13 wherein identifying a plurality of vehicles that are available to the player for use in the game includes identifying a plurality of aircraft.

16. The method of claim 13 wherein enabling the player to use the second vehicle in the game includes enabling the player to use the vehicle in a racing game.

17. The method of claim 13 wherein enabling the player to test the first vehicle includes enabling the first player to test drive the first vehicle on a simulated test track.

18. The method of claim 13 wherein enabling the player to test the first vehicle includes enabling the first player to drive the first vehicle on a first simulated track, and wherein enabling the player to use the second vehicle in the game includes enabling the player to drive the second vehicle on a second simulated track different than the first simulated track.

19. The method of claim 13 wherein the first and second vehicles are one in the same simulated vehicle.

20. A computer-readable medium containing instructions causing a computer to implement a game by a method comprising:
identifying a plurality of simulated vehicles that are available to a player for use in the game;
displaying more than one simulated vehicle in a simulated garage setting, wherein the more than one simulated vehicle may be displayed simultaneously;
receiving a selection from the player of one of the vehicles; and
in response to receiving the selection, enabling the player to test the vehicle before the start of game play, wherein the player may not use the vehicle for game play if the user has not purchased the vehicle.

21. The computer-readable medium of claim 20 wherein the game includes a race, and wherein enabling the player to test the vehicle includes enabling the player to test drive a simulated car before the start of the race.

22. The computer-readable medium of claim 20 wherein the game includes a race, wherein enabling the player to test the vehicle includes enabling the player to test drive a first simulated car on a first simulated track before the start of the race, and wherein the method further comprises enabling the player to drive a second simulated car on a second simulated track during the race.

23. The computer-readable medium of claim 20 wherein identifying a plurality of simulated vehicles that are available to a player for use in the game includes displaying one or more cars in a simulated showroom setting.

24. The computer-readable medium of claim 20 wherein enabling the player to test the vehicle before the start of game play includes enabling the player to control the vehicle in a simulated environment via manipulation of one or more user-interaction mechanisms on a hand-held controller operably connected to a console-based gaming system.

25. The computer-readable medium of claim 20 wherein enabling the player to test the vehicle before the start of game play includes displaying an interval of time it takes the vehicle to circulate a simulated test track under control of the player.

26. A computer-readable medium including a screen display for use in a game, the screen display including:
at least one simulated car;
an interior portion of a simulated showroom, wherein the at least one simulated car is positioned in the interior portion of the simulated showroom, wherein the interior portion of the simulated showroom is configured to display multiple simulated cars simultaneously; and
a user-input field configured to receive a selection from a player indicating the player's desire to test drive the simulated car before using the car in a simulated race, wherein the simulated car may not be used in the simulated race if the simulated car has not been purchased.

27. The computer-readable medium of claim 26 wherein the showroom is a garage.

28. The computer-readable medium of claim 26 wherein the user-input field is a first user-input field configured to receive a first selection from a player, and wherein the screen display further includes a second user-input field configured to receive a second selection from the player, the second selection indicating the player's desire to use the car in the simulated race.

29. The computer-readable medium of claim 26, further comprising a points status field, wherein the points status field displays an amount of points the player has earned by playing the racing game.

30. The computer-readable medium of claim 26, further comprising a cost field displaying a cost associated with using the car in the simulated race.

31. The computer-readable medium of claim 26, further comprising:
a cost field displaying an amount of points a player must have to use the car in the simulated race; and
a points status field, wherein the points status field displays an amount of the points the player has earned by playing the racing game.

* * * * *